(12) United States Patent
Xu et al.

(10) Patent No.: US 10,275,091 B2
(45) Date of Patent: Apr. 30, 2019

(54) TOUCH DETECTION METHOD AND APPARATUS FOR TOUCH DISPLAY SCREEN

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Bo Xu, Beijing (CN); Shuai Hou, Beijing (CN); Wu Wang, Beijing (CN); Xianyong Gao, Beijing (CN); Lisheng Liang, Beijing (CN); Siqing Fu, Beijing (CN); Yih Jen Hsu, Beijing (CN); Fei Shang, Beijing (CN); Haijun Qiu, Beijing (CN)

(73) Assignees: BOE Technology Group Co., Ltd., Beijing (CN); Chongqing BOE Optoelectronics Technology Co., Ltd, Chongqing (CN)

( * ) Notice: Subject to any disclaimer, the term of this patent is extended or adjusted under 35 U.S.C. 154(b) by 104 days.

(21) Appl. No.: 15/503,890

(22) PCT Filed: Aug. 18, 2016

(86) PCT No.: PCT/CN2016/095842
§ 371 (c)(1),
(2) Date: Feb. 14, 2017

(87) PCT Pub. No.: WO2017/059738
PCT Pub. Date: Apr. 13, 2017

(65) Prior Publication Data
US 2017/0277352 A1 Sep. 28, 2017

(30) Foreign Application Priority Data
Oct. 10, 2015 (CN) .......................... 2015 1 0653583

(51) Int. Cl.
*G06F 3/041* (2006.01)
*G06F 3/044* (2006.01)
(Continued)

(52) U.S. Cl.
CPC .......... *G06F 3/0418* (2013.01); *G06F 1/3262* (2013.01); *G06F 3/044* (2013.01);
(Continued)

(58) Field of Classification Search
CPC combination set(s) only.
See application file for complete search history.

(56) References Cited

U.S. PATENT DOCUMENTS

2011/0025619 A1 2/2011 Joguet et al.
2013/0293484 A1 11/2013 Singh et al.
(Continued)

FOREIGN PATENT DOCUMENTS

CN 101903857 A 12/2010
CN 202142044 2/2012
(Continued)

OTHER PUBLICATIONS

Bo Wang CN202142044 English translation Aug. 2, 2012.*
(Continued)

*Primary Examiner* — Van N Chow
(74) *Attorney, Agent, or Firm* — Harness, Dickey & Pierce, P.L.C.

(57) ABSTRACT

The disclosure provides a touch detection method and apparatus for a touch display screen, wherein a time period for scanning the touch display screen within each frame comprises a display scanning phase and a touch scanning phase, the method comprising: scanning a part of the touch display screen during the touch scanning phase to detect whether there is a touch signal; and reducing a frame rate of the touch display screen and scanning the whole touch
(Continued)

display screen when the touch signal is detected. Accordingly, the charging time of the panel is guaranteed while displaying and touch detecting functions are multiplexed.

20 Claims, 2 Drawing Sheets

(51) Int. Cl.
  *G09G 3/36* (2006.01)
  *G06F 1/3234* (2019.01)

(52) U.S. Cl.
  CPC .......... *G06F 3/0412* (2013.01); *G06F 3/0416* (2013.01); *G09G 3/3677* (2013.01); *G09G 2310/0251* (2013.01); *G09G 2310/0297* (2013.01); *G09G 2310/08* (2013.01); *G09G 2354/00* (2013.01)

(56) References Cited

U.S. PATENT DOCUMENTS

| | | |
|---|---|---|
| 2016/0132170 A1 | 5/2016 | Zhang et al. |
| 2016/0246431 A1 | 8/2016 | Ma et al. |

FOREIGN PATENT DOCUMENTS

| | | |
|---|---|---|
| CN | 103558941 A | 2/2014 |
| CN | 104063105 | 9/2014 |
| CN | 104360781 A | 2/2015 |
| CN | 105204703 A | 12/2015 |

OTHER PUBLICATIONS

Written Opinion of the International Searching Authority from corresponding PCT Application No. PCT/CN2016/095842, dated Nov. 3, 2016 (5 pages).
Office Action from corresponding Chinese Application No. 201510653583.2, dated Apr. 25, 2016 (6 pages).
Office Action from corresponding Chinese Application No. 201510653583.2 dated Aug. 28, 2017 (6 pages).

\* cited by examiner

TOUCH DETECTION METHOD AND APPARATUS FOR TOUCH DISPLAY SCREEN

CROSS-REFERENCE TO RELATED APPLICATION

This application claims the benefit and priority of Chinese Patent Application No. 201510653583.2 filed on Oct. 10, 2015, the entire content of which is incorporated herein by reference.

FIELD

The disclosure generally relates to the field of touch display screen, and in particular to a touch detection method and apparatus for the touch display screen.

BACKGROUND

Nowadays with widespread use of the liquid crystal display (LCD) products, consumers are increasingly attracted to those provided with touch functions. In particular, the popularity of smart phones leads to increasing demand and use of touch screens. The touch mode currently used is primarily the capacitive touch, including On Cell touch mode and In Cell touch mode including Full In Cell touch mode, with the capacitance sensing adopting self-capacitance sensing. By introducing metal wires into the array, multiple advantages are achieved, such as high signal to noise ratio, low resistance, and the grayscale transformation imposing less effect on sensing electrodes. However, because of the fact that a large number of touch electrodes is used and that the source and touch electrodes share the same IC, the displaying and touch detecting functions are realized by time division driving. In particular, switching to the source electrode is carried out to enable displaying function and switching to the touch electrode is carried out to enable touch detecting function. By reducing the LCD's row-by-row scanning interval (H-Blank) while prolonging its frame-by-frame scanning interval (V-Blank) during which the touch operation is performed, or by combining multiple V-Blanks in order to enable time division multiplexing of displaying and touch detecting functions, the time division driving approach spares a part of charging time of the touch display screen panel to implement the touch detecting function. In this case, charging time of the panel cannot be guaranteed, resulting in insufficient charging of the panel. Moreover, power consumption of the touch display screen is increased as the displaying and touch detecting functions are simultaneously provided. In short, although the current driving technology enables multiplexing of the displaying and touch detecting functions, it cannot guarantee charging time of the panel so as to achieve the optimal display effects.

SUMMARY

According to the prior art touch detection method, it switches to the touch electrodes upon detecting the touch signals. By shortening the H-Blank and prolonging the V-Blank, the charging time of the touch display screen is reduced in order to spare time for the touch detecting function, which results in insufficient charging of the touch display screen. As such, there is a need to improve touch detection of the prior art touch display screen, so as to guarantee the charging time and enhance the display effects of the display panel whilst the both the displaying and touch detecting functions are achieved. To solve the above discussed problem of insufficient charging time of the touch display screen, the disclosure proposes a novel touch detection method and apparatus.

The disclosure provides a touch detection method for a touch display screen, wherein a time period for scanning the touch display screen within each frame comprises a display scanning phase and a touch scanning phase, the method comprising:

scanning a part of the touch display screen during the touch scanning phase to detect whether there is a touch signal; and reducing a frame rate of the touch display screen and scanning the whole touch display screen when the touch signal is detected.

The disclosure further provides a touch detection apparatus for a touch display screen, wherein a time period for scanning the touch display screen within each frame comprises a display scanning phase and a touch scanning phase, the apparatus comprising:

scanning means configured to scan a part of the touch display screen during the touch scanning phase to detect a touch signal; and processing means configured to reduce a frame rate of the touch display screen and cause the scanning means to scan the whole touch display screen when the scanning means detects the touch signal.

The disclosure aims to make improvements to insufficient charging associated with the Full In Cell time division driving. By adopting time division control and frequency modulation control, the charging time of the panel is not affected by the touch detecting operation while the time for touch detecting operation is guaranteed. In this way, the displaying and touch detecting functions are multiplexed and at the same time the charging time is ensured.

DRAWINGS

The disclosure, its preferred use and further objects can be better understood by reading the following detailed description made with reference to the drawings in which.

Figure 3:
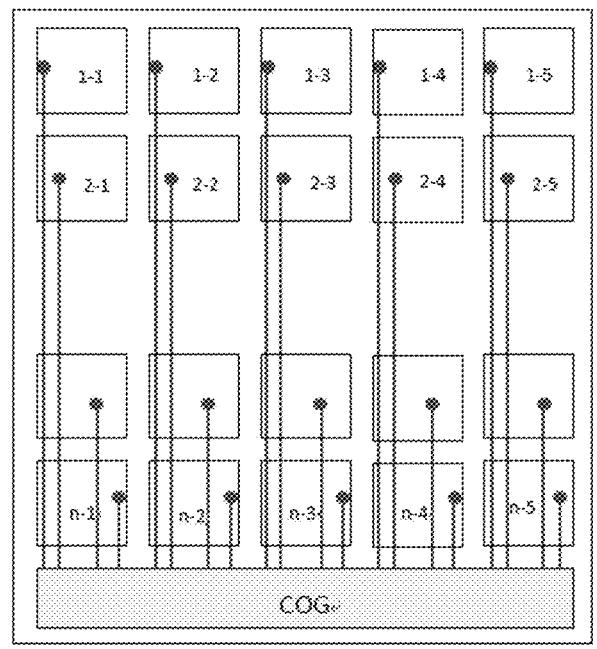
Figure 4:
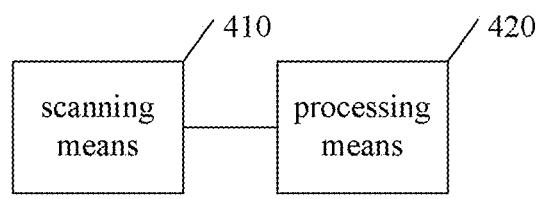

FIG. 3 schematically illustrates the touch scanning array of the Full In Cell touch mode; and FIG. 4 is a block diagram illustrating a touch detection apparatus for the touch display screen according to an embodiment of the disclosure.

DETAILED DESCRIPTION

Now the embodiments of the disclosure will be described in detail with reference to the drawings. References throughout this specification to features, advantages, or similar language do not imply that all of the features and advantages that may be realized with the disclosure should be or are in any single embodiment of the invention. Rather, language referring to the features and advantages is understood to mean that a specific feature, advantage, or characteristic described in connection with an embodiment is included in at least one embodiment of the disclosure. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

To solve the problem set forth above, the disclosure makes improvements to insufficient charging associated with the Full In Cell time division driving. By adopting time division control and frequency modulation control, the charging time of the panel is not affected by the touch detecting operation while the time for touch detecting operation is guaranteed. In this way, the displaying and touch detecting functions are multiplexed and at the same time the charging time is ensured.

The disclosure provides improvements to insufficient charging associated with the Full In Cell time division driving, wherein it adopts time division control and frequency modulation control for the Full In Cell touch screen, such that the charging time of the panel is not affected by the touch detecting operation while the time for touch detecting operation is guaranteed, whereby the insufficient charging of the display panel is improved.

Figure 1:
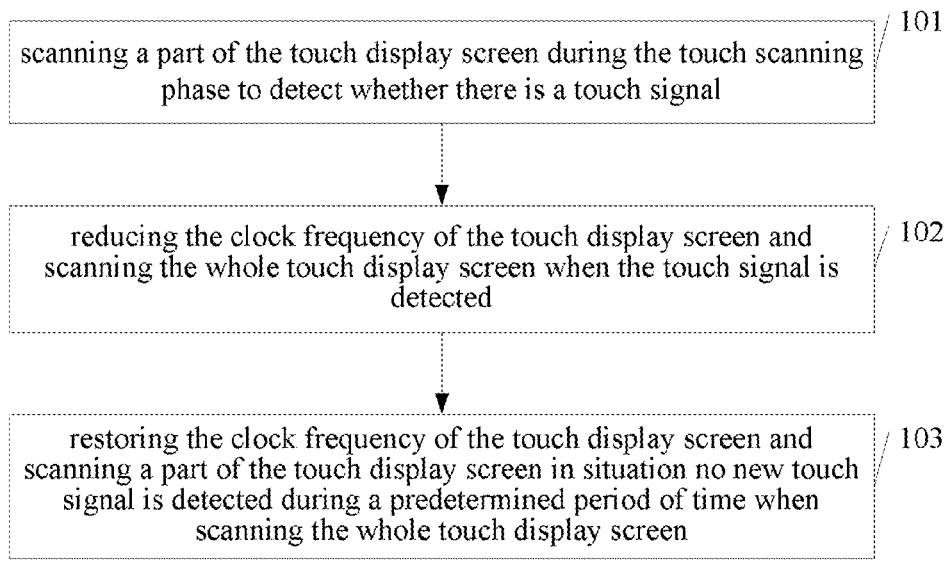
FIG. 1 is a flow chart illustrating a touch detection method for the touch display screen according to an embodiment of the disclosure.

The disclosure provides a touch detection method for a touch display screen, wherein a time period for scanning the touch display screen within each frame comprises a display scanning phase and a touch scanning phase. As shown in FIG. 1, the method comprises: a step 101 of scanning a part of the touch display screen during the touch scanning phase to detect whether there is a touch signal; and a step 102 of a frame rate of the touch display screen and scanning the whole touch display screen when the touch signal is detected, wherein the frame rate can also be replaced by clock frequency or refresh rate and is indicative of the number of frames displayed per second, for example, a frame rate of 60 Hz means displaying 60 frames per second. As such, both time division control and frequency modulation control are adopted for the Full In Cell touch screen, such that the charging time of the panel is not affected by the touch detecting operation while the time for touch detecting operation is guaranteed.

According to an embodiment, the method further comprises a step 103 at which the frame rate of the touch display screen is restored and a part of the touch display screen is scanned, if no new touch signal is detected during a predetermined time period for scanning the whole touch display screen. Depending on the practical need, the predetermined period of time may be set to, for example, 10 seconds.

According to an embodiment, the step of scanning a part of the touch display screen comprises scanning a part of the array of rows, a part of the array of columns, a part of the arrays that are not adjacent to each other, or an area of the touch display screen.

According to an embodiment, the step of scanning the part of the array of rows or columns comprises alternately scanning the array of odd and even rows or odd and even columns of the touch display screen within different frames.

According to an embodiment, the step of reducing the frame rate of the touch display screen comprises reducing the frame rate of the touch display screen from, for example, 60 Hz to 48 Hz or 50 Hz.

According to an embodiment, the touch scanning is performed during blank time of each frame.

According to an embodiment, the predetermined period of time is 10 seconds.

Figure 2:
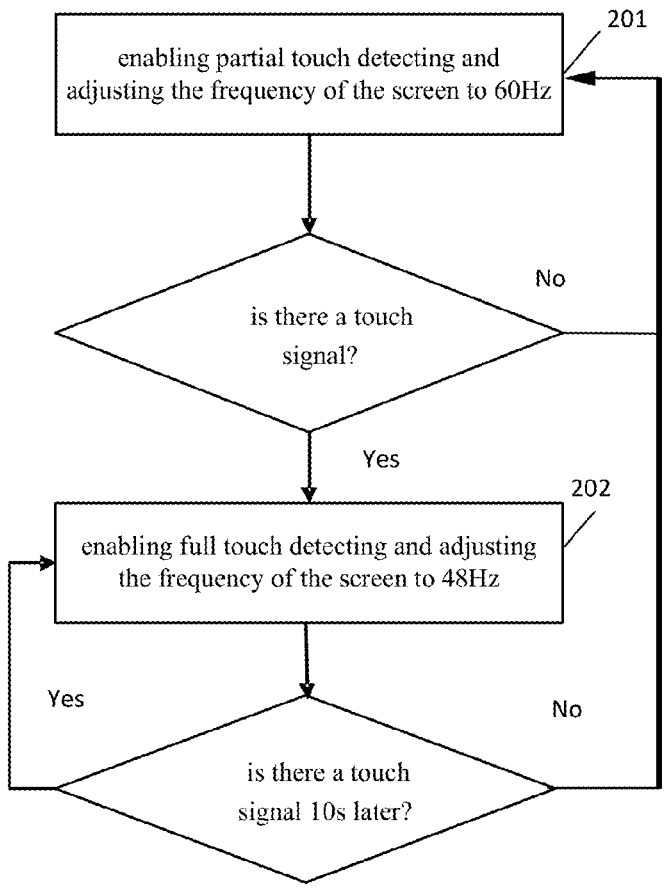
FIG. 2 is a flow chart illustrating a touch detection method for the touch display screen according to another embodiment of the disclosure.

Now a specific example is provided to illustrate the touch detection method for touch display screen provided by the disclosure. As shown in FIG. 2, the method comprises the steps discussed hereunder.

At step 201, touch signal detection is carried out. More specifically, touch scanning is enabled for blank time of each frame. However, the touch scanning is only partially enabled, i.e., only a part of the touch display screen is scanned. For example, it is possible to scan a part of the array of rows, a part of the array of columns, a part of the arrays that are not adjacent to each other, or an area of the touch display screen, wherein the step of scanning the part of the array of rows or columns of the touch display screen comprises alternately scanning the array of odd and even rows or odd and even columns of the touch display screen within different frames. For example, as shown in FIG. 3, under the control of a chip on glass (COG), in the first frame the touch screen scanning module is enabled for the scanning of the array of 1-1, 1-3, 1-5; 2-2, 2-4; 3-1, 3-3, 3-5; . . . ; n-1, n-3, n-5 only. If no touch signal is detected, scanning of the array of 1-2, 1-4; 2-1, 2-3, 2-5; 3-2, 3-4; . . . ; n-2, n-4 is enabled in the next frame. If still no touch signal is detected, the scanning proceeds in the way similar to that previously described. As a result, the scanning can be completed during a relatively short blank time.

At step 202, if a touch signal is detected on the display, the frame rate is regulated to 48 Hz or 50 Hz in the next frame and the touch scanning function is fully enabled to judge and feedback the touch signal, whereby the time for touch detection is increased with the normal signal scanning time and charging time remaining unchanged, achieving full scanning of any touch.

Next, if no touch signal is detected again for a period of time (which may be set to, for example, 10 seconds depending on practical need), the frame rate is returned to 60 Hz and the process returns to step 201 where the scanning function is partially enabled.

The disclosure further provides a touch detection apparatus for a touch display screen, wherein a time period for scanning the touch display screen within each frame comprises a display scanning phase and a touch scanning phase, the apparatus comprises: scanning means 410 configured to scan a part of the touch display screen during the touch scanning phase to detect a touch signal; and processing means 420 configured to reduce a frame rate of the touch display screen and cause the scanning means 410 to scan the whole touch display screen when the scanning means 410 detects the touch signal.

According to an embodiment, the processing means 420 is further configured to restore the frame rate of the touch display screen and cause the scanning means 410 to scan a part of the touch display screen, if no new touch signal is detected during a predetermined time period for the scanning means 410 scanning the whole touch display screen.

According to an embodiment, the scanning means 410 is configured to scan a part of the array of rows, a part of the array of columns, a part of the arrays that are not adjacent to each other, or an area of the touch display screen.

According to an embodiment, the scanning means 410 is configured to alternately scan the array of odd and even rows or odd and even columns of the touch display screen within different frames.

According to an embodiment, the processing means 420 is configured to reduce the frame rate of the touch display screen from 60 Hz to 48 Hz or 50 Hz.

According to an embodiment, the touch scanning is performed during blank time of each frame.

According to an embodiment, the predetermined period of time is 10 seconds.

According to an embodiment, the scanning means 410 is implemented as a Chip on Glass (COG).

With the touch detection method and apparatus for the touch display screen according to the disclosure, scanning and detection of the touch signal are achieved with the normal signal scanning time and charging time remaining unchanged. Moreover, since the touch detecting function is not fully enabled and the frame rate is reduced, the power consumption of the display is lowered while the standby time of the display is increased.

At least one of the scanning means 410 and processing means is envisaged to comprise program instructions which, when executed, cause the apparatus to operate as described in above embodiments. Any of the scanning means 410 and processing means 420 may be integrated or embodied as separate components and may be of any type suitable to the local technical environment, and may include one or more of general purpose computers, special purpose computers, microprocessors, digital signal processors (DSPs) and processors based on a multi-core processor architecture, as non-limiting examples. The ROMs may be of any type suitable to the local technical environment and may be implemented using any suitable data storage technology, such as semiconductor based memory devices, flash memory, magnetic memory devices and systems, optical memory devices and systems, fixed memory and removable memory.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

At least some aspects of the invention may be embodied in computer-executable instructions, such as in one or more program modules, executed by one or more computers or other devices. Generally, program modules include routines, programs, objects, components, data structures, and so forth, which perform particular tasks or implement particular abstract data types. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although the invention has been described by way of examples of preferred embodiments, it is to be understood that various other modifications may be made within the spirit and scope of the invention. Therefore, the scope of the invention is not limited to these preferred embodiments, and it is the object of the appended claims to cover any and all such variations and modifications as come within the true spirit and scope of the invention.

The invention claimed is:

1. A method of detecting touch for a touch display screen, wherein a time period for scanning the touch display screen within each frame comprises a display scanning phase and a touch scanning phase, the method comprising:
   scanning a part of the touch display screen during the touch scanning phase to detect whether there is a touch signal, wherein the part of the touch display screen is smaller than the whole touch display screen; and
   reducing a frame rate of the touch display screen and scanning the whole touch display screen when the touch signal is detected.

2. The method according to claim 1, further comprising:
   restoring the frame rate of the touch display screen and scanning the part of the touch display screen when a new touch signal is not detected during a predetermined time period for scanning the whole touch display screen.

3. The method according to claim 2, wherein scanning the part of the touch display screen comprises scanning a part of an array of rows, a part of an array of columns, a part of the arrays that are not adjacent to each other, or an area of the touch display screen.

4. The method according to claim 3, wherein scanning the part of the array of rows or columns comprises alternately scanning arrays of odd and even rows, or odd and even columns, of the touch display screen within different frames.

5. The method according to claim 1, wherein reducing the frame rate of the touch display screen comprises reducing the frame rate of the touch display screen from 60Hz to 48Hz or 50Hz.

6. The method according to claim 1, wherein the scanning is performed during blank time of each frame.

7. The method according to claim 2, wherein the predetermined time period is 10 seconds.

8. A touch detection apparatus for a touch display screen, wherein a time period for scanning the touch display screen comprises a display scanning phase and a touch scanning phase within each frame, the apparatus comprising:
   scanning means configured to scan a part of the touch display screen during the touch scanning phase to detect a touch signal, wherein the part of the touch display screen is smaller than the whole touch display screen; and
   processing means configured to reduce a frame rate of the touch display screen and control the scanning means to scan the whole touch display screen when the scanning means detects the touch signal.

9. The apparatus according to claim 8, wherein the processing means is further configured to restore the frame rate of the touch display screen and control the scanning means to scan the part of the touch display screen when a new touch signal is not detected during a predetermined time period for the scanning means to scan the whole touch display screen.

10. The apparatus according to claim 9, wherein the scanning means is configured to scan a part of an array of rows, a part of an array of columns, a part of the arrays that are not adjacent to each other, or an area of the touch display screen.

11. The apparatus according to claim 10, wherein the scanning means is configured to alternately scan arrays of odd and even rows, or odd and even columns, of the touch display screen within different frames.

12. The apparatus according to claim 8, wherein the processing means is configured to reduce the frame rate of the touch display screen from 60Hz to 48Hz or 50Hz.

13. The apparatus according to claim 8, wherein the scanning is performed during blank time of each frame.

14. The apparatus according to claim 9, wherein the predetermined time period is 10 seconds.

15. The apparatus according to claim 8, wherein the scanning means includes a Chip on Glass (COG).

16. The method according to claim 2, wherein reducing the frame rate of the touch display screen comprises reducing the frame rate of the touch display screen from 60Hz to 48Hz or 50Hz.

17. The method according to claim 2, wherein the scanning is performed during blank time of each frame.

18. The apparatus according to claim 9, wherein the processing means is configured to reduce the frame rate of the touch display screen from 60Hz to 48Hz or 50Hz.

19. The apparatus according to claim 9, wherein the scanning is performed during blank time of each frame.

20. The apparatus according to claim 9, wherein the scanning means includes a Chip on Glass (COG).

\* \* \* \* \*